Dec. 22, 1942.  A. PECHUKAS  2,306,184
PRODUCTION OF TITANIUM TETRAHALIDES
Filed Feb. 16, 1940
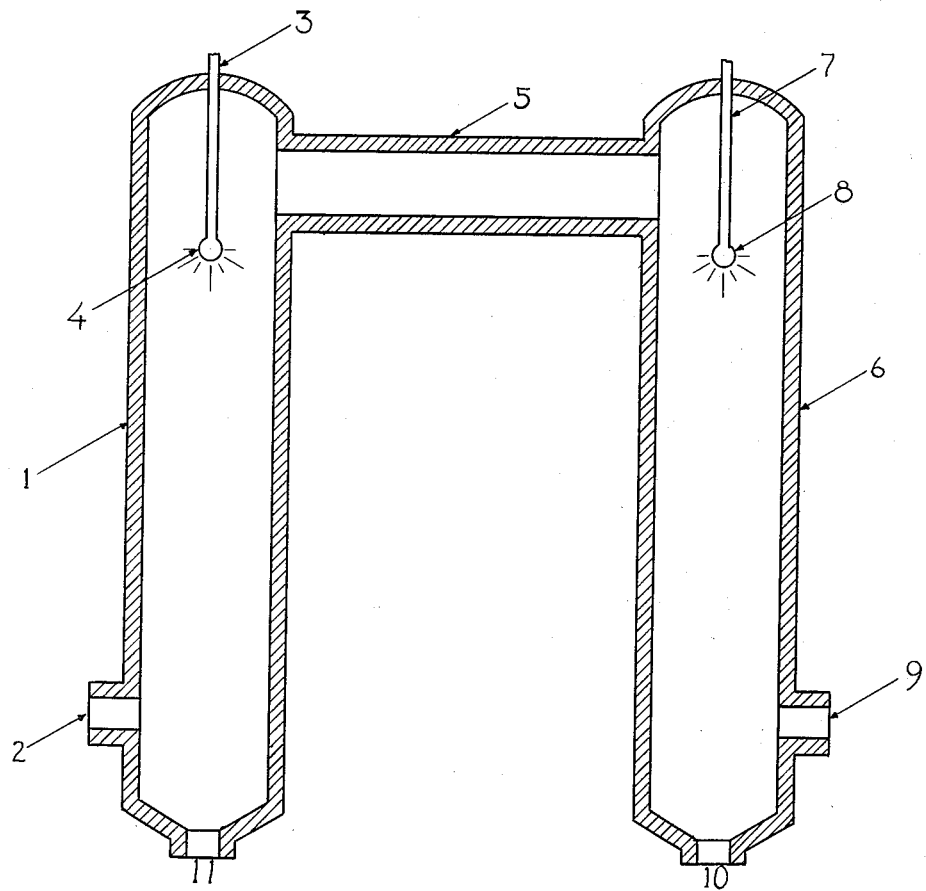
INVENTOR.
ALPHONSE PECHUKAS
BY Raymond S. Chisholm
ATTORNEY.

Patented Dec. 22, 1942

2,306,184

UNITED STATES PATENT OFFICE 2,306,184

PRODUCTION OF TITANIUM TETRAHALIDES

Alphonse Pechukas, Akron, Ohio, assignor to Pittsburgh Plate Glass Company, Alleghany County, Pa., a corporation of Pennsylvania Application February 16, 1940, Serial No. 319,294

14 Claims. (Cl. 75—111)

This invention relates to a method of recovering a titanium tetrahalide such as titanium tetrachloride from vapor mixtures containing the same. In the preparation of titanium tetrachloride it is the usual practice to chlorinate a titanium bearing residue such as rutile, ferrotitanium, or titanium ores at an elevated temperature whereby titanium tetrachloride is formed and volatilized. The tetrachloride is then condensed and recovered. In the condensation of the tetrachloride, however, it is often difficult to condense the halide completely and often a large portion of the titanium values are lost in the exhaust gases.

The chlorination of titanium bearing materials often is conducted in the presence of carbon or similar reducing agent. In consequence a substantial quantity of carbon dioxide and/or carbon monoxide often is present in the gases containing the titanium tetrachloride. In addition, chlorine diluted with various gases such as nitrogen, air, carbon dioxide, etc. may be used in the chlorination thus resulting in a substantial increase in the amount of diluent gases mixed with the titanium tetrachloride vapor. Accordingly the content of titanium tetrachloride in the gases may be below 90 percent by volume and in many cases the gas from which the tetrachloride must be recovered contains less than 50 percent by volume of titanium tetrachloride.

In accordance with my invention, I have found that a substantially complete removal of titanium tetrachloride from the gases containing the same such as those which result from the chlorination of titanium bearing materials may be obtained. I have found that substantially all of the tetrachloride may be removed by a washing treatment which may involve one or more stages. Thus, the gases containing vaporized titanium tetrachloride may be cooled to a suitable temperature, for example, below about 30° C., and preferably not substantially in excess of 0° C. by subjecting them to the action of a spray of cold liquid halide, preferably titanium tetrachloride. This treatment permits a fractional condensation of the tetrachloride from the mixture and is found to remove the major portion, generally in excess of 90 percent, of the tetrachloride from the gases. Thereafter, it may be found desirable to conduct the gases which may contain 0.2 to 5 percent or more by volume of the tetrachloride into another chamber where they are subjected to a spray of water or other solvent. This water spray dissolves or otherwise absorbs the residual titanium tetrachloride. The water solution is then collected and may be heated to hydrolyze the tetrachloride and produce titanium hydrate which may be recovered in a suitable manner.

The invention will be more fully understood by reference to the following description illustrated by the accompanying drawing which is a diagrammatic sectional view of a method of treatment in accordance with my invention. In accordance with the method illustrated by the drawing, gases containing titanium tetrachloride vapor are introduced into spray chamber 1, through inlet 2, and pass upwardly through the chamber, being bathed in a spray of liquid titanium tetrachloride which is supplied to the chamber by conduit 3, which discharges through sprayhead 4. The temperature of the liquid tetrachloride is maintained sufficiently low to permit effective condensation, for example, below about 30° C., and preferably, not substantially in excess of 40° C. In this manner, a large portion of the vaporized tetrachloride is condensed and collected at the base of the chamber where it is withdrawn through outlet 11.

The gases with uncondensed titanium tetrachloride are withdrawn through conduit 5, and conveyed to a second spray column 6, where it is sprayed with water from sprayhead 8, which is connected to a source of water by means of conduit 7. Washed gases which are substantially free from titanium tetrachloride are withdrawn through outlet 9, and the water solution or suspension of titanium compounds is withdrawn at 10.

The titanium tetrachloride vapors may be prepared by any convenient process. In accordance with one suitable modification, it is found desirable to prepare the titanium chloride by a suitable chlorination process such as is described by Patent No. 2,184,887, granted to Irving E. Muskat and Robert H. Taylor. In accordance with the process described therein, ilmenite or similar iron titanium ore is chlorinated in the presence of 15 to 35 percent of carbon at a temperature above 600° C., and preferably at 850 to 1250° C. This results in the production of a gaseous mixture containing vaporized iron and titanium chlorides.

The vapors containing iron chloride and titanium tetrachloride may be cooled to a convenient temperature below the temperature at which ferric chloride vaporizes. In the event that it is desired to avoid condensation of titanium tetrachloride with the iron chloride, the vapor temperature should be held above the dew point of titanium tetrachloride, for example, above 75° C.

However, in many cases it is found advantageous to condense a quantity, generally not less than about 20 to 30 percent of the titanium tetrachloride with the iron chloride and in such a case the vapor temperature will be maintained at or below the vaporization point of titanium tetrachloride.

I have found that when a mixture of iron and titanium chlorides are cooled a large portion or substantially all of the iron chloride solidifies. However, much of the solidified iron chloride remains suspended in the vapor mixture and as a consequence, is carried over into other parts of the condenser system. By washing the gaseous mixture with liquid titanium tetrachloride, however, the major portion of the suspended iron chloride is removed and the residual vapor may be conducted to another portion of the condenser and cooled to condense titanium tetrachloride without fear of plugging the apparatus. The washing may be effected by spraying the gases with titanium tetrachloride, as described in my copending application Serial No. 284,561, filed July 14, 1939, now United States Letters Patent No. 2,245,358, issued June 10, 1941.

The gaseous mixture containing carbon dioxide and/or carbon monoxide, and chlorine and titanium chloride thereafter is treated to recover titanium tetrachloride in accordance with the present invention. While titanium tetrachloride is especially effective, various other liquid halides, metallic or organic, such as titanium tetrafluoride or tetrabromide, silicon or stannic tetrachloride or carbon tetrachloride, or liquid mixtures containing these halides may be used. Use of titanium tetrachloride for this purpose, however, is particularly desirable since separation of the titanium tetrahalide from large amounts of other halides required to condense the titanium halide is rendered unnecessary. Thus, a portion of the condensed titanium tetrachloride may be withdrawn from the base of the spray chamber, cooled, if necessary, and recycled to the sprays. In order to effect an efficient recovery of the titanium tetrachloride, it is preferred to maintain the temperature of the sprayed tetrachloride introduced through the sprays below about 15° C. and preferably not in excess of about 0° C.

It will be apparent that during the upward passage of the gases a large portion of the titanium tetrachloride is condensed. The cold liquid tetrachloride falls to the bottom of the column bathing the gases in the lower portion of the column and assisting in their condensation. This permits operation without requirement of excessive amounts of previously cooled titanium tetrachloride. Thus, the step of washing the vapors may be conducted without introduction of a large quantity of liquid titanium tetrachloride by cooling the gases in the upper portion of the tower to a high degree whereby cold liquid titanium tetrachloride is cooled and falls countercurrently to the rising gases and assists in the cooling and condensation of the gases.

The gases after removal from titanium tetrachloride spray chamber may occasionally contain a small amount of titanium tetrachloride which may be removed by treating the gases with a spray of water. In order to prevent hydrolysis of the tetrachloride in the spray chamber, it is often desirable to utilize an aqueous solution of the tetrachloride of sufficient strength to keep the tetrachloride in solution and to maintain the temperature of the solution below the temperature at which the solution hydrolyzes to precipitate the titanium hydrate, for example, below 35° C. Thus, a solution having a concentration of 10-25 percent of TiCl₄ may be used for this purpose. This solution may be recycled and portions withdrawn and treated to recover the titanium therein.

If desired, the vaporized titanium tetrachloride may be hydrolyzed directly by introduction of either water or steam through the sprays. In such a case it is desirable to effect the decomposition out of contact with hot surfaces during the decomposition. This appears to be particularly desirable when the tetrachloride vapor is hydrolyzed at a high temperature, for example, at 400-800° C., since in the presence of hot surfaces the titanium dioxide tends to form crystals which render the product unsuitable as a pigment. In consequence, it often is desirable to maintain an atmosphere of an inert gas such as nitrogen or carbon dioxide adjacent the steam or water inlet. This may be done by placing a shell about the sprayhead and introducing the inert gas into the shell, thus preventing contact of the titanium tetrachloride with the sprayhead. As a further modification, however, the gases may be introduced at the bottom of the column and countercurrently washed with water whereby the hydrolysis occurs mainly at the base of the column.

The following example is illustrative:

Using a furnace having an internal diameter of 15 inches which was preheated to a temperature of 1000° C., briquettes prepared from a mixture containing 100 parts ore, 23 parts C, and 14 parts molasses, were introduced at a rate of 120 pounds per hour and chlorine at 2.0 to 2.5 pounds per minute. The temperature of the reaction zone was maintained at 850 to 1150° C. by the heat evolved from the reaction and a gaseous mixture of iron and titanium chlorides was produced.

The gaseous mixture containing iron chloride and titanium tetrachloride was cooled to 135° C. and the iron chloride condensed and was removed by washing the gas with liquid titanium tetrachloride. Thereafter the gases were cooled to 0° C. by washing with a spray of liquid titanium tetrachloride which had been previously cooled below 0° C. and in excess of 98 percent of the titanium tetrachloride was condensed and recovered. The exhaust gases were then sprayed with water at a temperature of 10 to 20° C. and substantially all of the titanium tetrachloride in the gases was removed from the gases.

While the invention has been described with particular reference to titanium tetrachloride it is apparent that the process may be applied to the recovery of titanium tetrafluoride, tetrabromide, or tetraiodide, in a similar manner.

Although the present invention has been described with particular reference to the specific details of certain embodiments thereof, it is not intended that such details shall be regarded as limitations upon the scope of the invention except insofar as included in the accompanying claims.

I claim:

1. The method of removing titanium tetrachloride from a vaporized mixture produced by the chlorination of a titanium bearing material which comprises washing the mixture with cold titanium tetrachloride and subsequently washing the uncondensed vapors with an aqueous medium.

2. The method of removing titanium tetrachloride from a vaporized mixture produced by the chlorination of a titanium bearing material which comprises washing the mixture with cold substantially anhydrous titanium tetrachloride and subsequently washing the uncondensed vapors with an aqueous solution of titanium tetrachloride.

3. The method of removing titanium tetrachloride from a vaporized mixture containing titanium tetrachloride and a substantial quantity of a gas of the group consisting of chlorine, oxides of carbon, and mixtures thereof which comprises washing the mixture with cold liquid substantially anhydrous titanium tetrahalide.

4. The method of removing titanium tetrachloride from a vaporized mixture which comprises washing the mixture with cold liquid substantially anhydrous halide.

5. The method of removing titanium tetrachloride from a vaporized mixture containing titanium tetrachloride and a substantial quantity of a gas of the group consisting of chlorine, oxides of carbon, and mixtures thereof which comprises washing the mixture with substantially anhydrous titanium tetrachloride having a temperature not in excess of about 30° C.

6. The method of removing titanium tetrachloride from a vaporized mixture which comprises washing the mixture with substantially anhydrous titanium tetrachloride having a temperature not in excess of about 0° C.

7. The method of claim 3 wherein the titanium tetrachloride content of the gases is below 90 percent by volume of the total vapor mixture.

8. The method of claim 10 wherein the titanium tetrachloride content of the gases is below 50 percent by volume of the total vapor mixture.

9. The method of removing titanium tetrachloride from a vaporized mixture which comprises washing the mixture with a cold liquid medium containing substantially anhydrous titanium tetrachloride.

10. The method of removing titanium tetrahalide from a vaporized mixture which comprises washing the mixture with a liquid medium substantially anhydrous comprising a cold liquid substantially anhydrous halide.

11. A method of preparing liquid titanium tetrachloride which comprises chlorinating a titanium bearing ore in the presence of a carbonaceous material whereby to form a vaporized mixture containing titanium tetrachloride and a gaseous oxide of carbon and washing the vaporized titanium tetrachloride with substantially anhydrous liquid titanium tetrachloride having a temperature not in excess of about 30° C.

12. A method of preparing liquid titanium tetrachloride which comprises chlorinating a titanium bearing ore in the presence of a carbonaceous material whereby to form a vaporized mixture containing titanium tetrachloride and a gaseous oxide of carbon and washing the vaporized titanium tetrachloride with substantially anhydrous liquid titanium tetrachloride having a temperature not in excess of about 0° C.

13. A method of preparing liquid titanium tetrachloride which comprises chlorinating a titanium bearing ore in the presence of a carbonaceous material whereby to form a vaporized mixture containing iron chloride, titanium tetrachloride and a gaseous oxide of carbon, condensing and removing iron chloride from the mixture, and washing the vaporized titanium tetrachloride with substantially anhydrous liquid titanium tetrachloride having a temperature not in excess of about 30° C.

14. A method of preparing liquid titanium tetrachloride which comprises chlorinating a titanium bearing ore in the presence of a carbonaceous material whereby to form a vaporized mixture containing iron chloride, titanium tetrachloride and a gaseous oxide of carbon, condensing the iron chloride, washing the iron chloride from the vaporized titanium tetrachloride with a liquid halide, and washing the vaporized titanium tetrachloride with substantially anhydrous liquid titanium tetrachloride having a temperature not in excess of about 0° C.

ALPHONSE PECHUKAS.